United States Patent
Yamamoto

(10) Patent No.: US 9,917,985 B2
(45) Date of Patent: Mar. 13, 2018

(54) METHOD AND SYSTEM FOR CHECKING COLOR AMONG A PRINTER HAVING AN IN-LINE SENSOR AND PRINTERS WITHOUT AN IN-LINE SENSOR

(71) Applicant: KONICA MINOLTA LABORATORY U.S.A., INC., San Mateo, CA (US)

(72) Inventor: Kazuto Yamamoto, Foster City, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 0 days.

(21) Appl. No.: 15/141,950

(22) Filed: Apr. 29, 2016

(65) Prior Publication Data
US 2017/0318195 A1    Nov. 2, 2017

(51) Int. Cl.
    G06K 15/02    (2006.01)
    H04N 1/60     (2006.01)
    H04N 1/00     (2006.01)

(52) U.S. Cl.
    CPC ....... *H04N 1/6055* (2013.01); *H04N 1/00347* (2013.01); *H04N 2201/0039* (2013.01); *H04N 2201/0094* (2013.01)

(58) Field of Classification Search
    USPC ............. 358/1.1–3.32, 1.11–1.18, 504, 512, 358/518–520
    See application file for complete search history.

(56) References Cited

U.S. PATENT DOCUMENTS

| | | | |
|---|---|---|---|
| 9,756,223 B2* | 9/2017 | Soriano | G06F 3/1217 |
| 2005/0018219 A1* | 1/2005 | Senn | G01J 3/50 |
| | | | 358/1.8 |
| 2007/0139734 A1* | 6/2007 | Fan | H04N 1/6033 |
| | | | 358/504 |
| 2013/0003090 A1* | 1/2013 | Sato | G03G 15/5062 |
| | | | 358/1.9 |
| 2014/0176970 A1* | 6/2014 | Iguchi | H04N 1/6033 |
| | | | 358/1.9 |
| 2014/0285832 A1* | 9/2014 | Miyamoto | H04N 1/60 |
| | | | 358/1.9 |

(Continued)

FOREIGN PATENT DOCUMENTS

JP    4812075 B2    11/2011

*Primary Examiner* — Marcellus Augustin
(74) *Attorney, Agent, or Firm* — Buchanan Ingersoll & Rooney PC

(57) ABSTRACT

A method, a system, and a non-transitory computer readable recording medium are disclosed for a first printer connected to a second printer to perform color calibration for the second printer, wherein the second printer does not have a sensor, the first printer including a sensor which measures a media, which has been printed by the second printer and is being fed on a media path of the first printer. The method includes (a) determining the timing to instruct the second printer to print a first measurement chart; (b) instructing, at the timing determined at step (a), the second printer to print the first measurement chart; (c) measuring, by the sensor, the first measurement chart which has been printed by the second printer; and (d) outputting information corresponding to a result measured at step (c).

20 Claims, 5 Drawing Sheets

(56) References Cited

U.S. PATENT DOCUMENTS

2015/0331639 A1* 11/2015 Piazza .................. G06F 3/1285
358/1.14
2016/0044209 A1* 2/2016 Tsukano .................. H04N 1/60
358/1.9

* cited by examiner

| Device: | Apparatus 1 | Apparatus 2 | Apparatus 3 | ... | Apparatus N |
|---|---|---|---|---|---|
| Sensor: | Yes | Yes | No | | No |
| Schedule: | Per 6 hours | Per 6 hours | Every 6:00 | | Every 6:00 |
| Non-Scheduled: | 6:25:00 PM | 6:25:00 PM | 6:25:00 PM | | N/A |
| Torelance: | 0.20 | 0.20 | 0.20 | | 0.20 |
| Detailed setting: | Group 1 Main | Group 1 | Group 1 | | Group 2 |

Fig. 3

| Device: | | Apparatus 1 | Apparatus 2 | Apparatus 3 | ... | Apparatus N |
|---|---|---|---|---|---|---|
| Device Model: | | C800 | C800 | C800 | | C500 |
| Group: | | Group 1 | Group 1 | Group 1 | | Group 2 |
| Read Device: | | Apparatus 1 | Apparatus 2 | Apparatus 1 | | Apparatus 1 |
| Measured: | 2/4/2016 6:00 | C=1.18 M=1.18 Y=0.77 K=1.41 | C=1.18 M=1.18 Y=0.77 K=1.41 | C=1.18 M=1.18 Y=0.77 K=1.41 | | C=1.18 M=1.18 Y=0.77 K=1.41 |
| | 2/4/2016 12:00 | C=1.17 M=1.18 Y=0.75 K=1.41 | C=1.16 M=1.18 Y=0.70 K=1.41 | N/A | | N/A |
| | 2/4/2016 18:00 | C=1.17 M=1.18 Y=0.51 K=1.41 | C=1.14 M=1.18 Y=0.69 K=1.41 | N/A | | N/A |
| | 2/4/2016 18:25 | C=1.18 M=1.18 Y=0.51 K=1.41 | C=1.14 M=1.18 Y=0.66 K=1.41 | C=1.16 M=1.18 Y=0.69 K=1.41 | | N/A |
| | 2/5/2016 0:00 | C=1.18 M=1.18 Y=0.77 K=1.41 | C=1.18 M=1.18 Y=0.77 K=1.41 | N/A | | N/A |
| | 2/5/2016 6:00 | C=1.18 M=1.18 Y=0.77 K=1.41 | C=1.18 M=1.18 Y=0.77 K=1.41 | C=1.18 M=1.18 Y=0.77 K=1.41 | | C=1.18 M=1.18 Y=0.77 K=1.41 |

Fig. 4

METHOD AND SYSTEM FOR CHECKING COLOR AMONG A PRINTER HAVING AN IN-LINE SENSOR AND PRINTERS WITHOUT AN IN-LINE SENSOR

FIELD OF THE INVENTION

The present disclosure generally relates to a method and system for checking color among a printer having an in-line sensor and printers without an in-line sensor, which can be used in color validation of color printers, multi-function peripherals (MFP) and/or image forming apparatuses.

BACKGROUND OF THE INVENTION

In today's printers, a document cannot be printed exactly the same over repeated printing, for example, hundreds of thousands of pages. Color quality will not be the same. For example, the shade of red will not be printed with the same shade from page 1 to page 1 million. Over time, the shade of red will look more "pinkish" in color. In order for the printer to print the same shade of red, the printer has to go through "color calibration". The concept is that when the printer prints the page looking "pinkish", the controller will compensate for the lack of redness and make the red color more "red", so that when the printer prints the page, it will lighten up the red.

For example, the color RED can be produced by mixing 100% of Yellow, 99% of Magenta, 0% of Cyan and 0% of Black. If for some reason the printed page looks pinkish, then the controller has to adjust the document so that it can increase Magenta to 100% and reduce Yellow to 70%. This way, the controller compensates the lack of "redness" by the printer by increasing the red component of the document. This process is called "calibration".

To achieve color calibration, a four-step process can be performed by printing a document from a printer. In calibration, this document is a hardcoded, canned document called a measurement chart. A device called a sensor scans the measurement chart and measures the color density. Sensor can include a handheld version and an in-line version. The handheld requires manual/human intervention as the user has to pick up the printed measurement chart from the printer tray, scans the document with a handheld device. The in-line version does not require manual/human intervention as the printer can print the measurement chart. The in-line sensor can be located on a paper path the output tray), and can measure the color density of the chart as the color chart exits the printer. The color measurements from the sensor are then sent to the controller. The controller adjusts the colors of the document to compensate for the printer's lack of color. The measurement chart can be resent again with the adjusted colors.

However, no two printers will print the same document exactly alike, even if the printers are exactly the same model since every printer has its own unique level of wear and tear. Over time, color quality will diminish over repeated printing, which can be become a problem with print shops because there may be situations where the print shop will receive a large print job order that requires multiple printers to finish the job within a tight schedule. In addition, the print shop may have a problem if the same document is split to different printers and each copy of the document is printed differently because color quality is different amongst the printers.

Thus, to perform color calibration "in-line", each printer must have an in-line sensor. In addition, it can be difficult to ensure that each printer will print the document the same, regardless of the differences of each printer's wear and tear.

SUMMARY OF THE INVENTION

Accordingly, it would desirable to have a method and system for performing color calibration across multiple image forming apparatuses or printers using a single in-line sensor attached to one of the image forming apparatuses or printers, and achieve printing the same document across different apparatuses or printers using the same color quality from printer to printer, regardless of the state of each apparatus or printer.

A method is disclosed for a first printer connected to a second printer to perform color calibration for the second printer, wherein the second printer does not have a sensor, the first printer including a sensor which measures a media, which has been printed by the second printer and is being fed on a media path of the first printer, the method comprising: (a) determining the timing to instruct the second printer to print a first measurement chart; (b) instructing, at the timing determined at step (a), the second printer to print the first measurement chart; (c) measuring, by the sensor, the first measurement chart which has been printed by the second printer; and (d) outputting information corresponding to a result measured at step (c).

A first printer is disclosed, which is connected to a second printer and configured to perform color calibration for the second printer, wherein the second printer does not have a sensor, the first printer comprising: a sensor which measures a media, which has been printed by the second printer and is being fed on a media path of the first printer; and a processor configured to: (a) determine the timing to instruct the second printer to print a first measurement chart; (b) instruct, at the timing determined at step (a), the second printer to print the first measurement chart; (c) measure, by the sensor, the first measurement chart which has been printed by the second printer; and (d) output information corresponding to a result measured at step (c).

A non-transitory computer readable recording medium stored with a computer readable program code is disclosed for a first printer connected to a second printer to perform color calibration for the second printer, and wherein the second printer does not have a sensor, the computer readable program code configured to execute a process comprising: (a) determining the timing to instruct the second printer to print a first measurement chart; (b) instructing, at the timing determined at step (a), the second printer to print the first measurement chart; (c) measuring, by a sensor on the first printer, the first measurement chart which has been printed by the second printer; and (d) outputting information corresponding to a result measured at step (c).

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3 is an illustration of a chart showing a list of measurement times for a plurality of image forming apparatuses in accordance with an exemplary embodiment.

FIG. 4 is an illustration of a diagram showing a list of color results for a plurality of image forming apparatuses in accordance with an exemplary embodiment.

DETAILED DESCRIPTION

Figure 1:
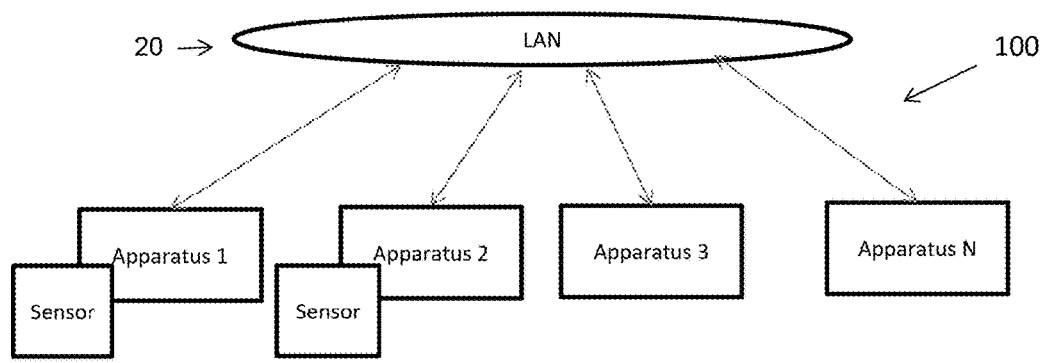
FIG. 1 is an illustration of a system including a plurality of image forming apparatuses in accordance with an exemplary embodiment in which at least one of the image forming apparatuses has a sensor, for example, an in-line sensor and at least one of the image forming apparatuses does not have a sensor.

Reference will now be made in detail to the present preferred embodiments of the invention, examples of which are illustrated in the accompanying drawings. Wherever possible, the same reference numbers are used in the drawings and the description to refer to the same or like parts.

In accordance with an exemplary embodiment, the word sensor, spectrophotometer, densitometer, color sensor, or colorimeter can be used interchangeably. In addition, throughout the disclosure including diagrams and flowcharts, the use of sensor means an in-line type of sensor that can be located on a paper path. The goal of an in-line sensor can be to measure the amount of light that is being reflected back into the sensor, thus measuring the density of the colors.

In accordance with an exemplary embodiment, the image forming apparatus (or printer) which has the sensor requests other image forming apparatuses (or printers) without sensors to print measurement chart and reads the charts with the sensor. The image forming apparatus can make the color list among devices periodically even if some image forming apparatuses do not have the sensor. As a result, the color differences among image forming apparatuses can be determined, which can be a cost savings to the user since each and every device not have to have a sensor, which can be expensive attached to each device. For example, in accordance with an en exemplary embodiment, only one device is required that can read the measurement chart of all other devices.

In accordance with an exemplary embodiment, the timing as to when the measurement charts are scanned and when it has to request the other printer devices for the measurement charts will allow all printers to print the document the same color quality regardless of each printers state of wear and tear.

FIG. 1 is an illustration of a system 100 including a plurality of image forming apparatuses or printers 1, 2, 3, N, in accordance with an exemplary embodiment in which some of the image forming apparatuses 1, 2, for example, printers or multi-function peripherals (MFP), have an in-line sensor and some of the image forming apparatuses or printers 3, N, do not have an in-line sensor. As shown in FIG. 1, the system 100 can include at least one image forming apparatus or printer 1, 2 having a sensor (or measuring unit) 6 (FIG. 2), for example, an in-line sensor, and at least one image forming apparatus or printer 3, N, which does not have a sensor. The at least one image forming apparatus 1, 2, having a sensor and the at least one image forming apparatus 3, N, which does not have a sensor can be connected via a communication network 10, for example, a LAN.

In accordance with an exemplary embodiment, the image forming apparatus or multi-function peripheral 1, 2, 3, N and the one or more host devices (not shown) can be connected to one another via communication network 20, for example, a LAN. For example, the communication network 20 can be a public telecommunication line and/or a network (for example, LAN or WAN) 20. Examples of the communication network 20 can include any telecommunication line and/or network consistent with embodiments of the disclosure including, but are not limited to, telecommunication or telephone lines, the Internet, an intranet, a local area network (LAN) as shown, a wide area network (WAN) and/or a wireless connection using radio frequency (RF) and/or infrared (IR) transmission.

Examples of multi-function peripherals 1, 2, 3, N, consistent with exemplary embodiments of the invention include, but are not limited to, a multi-function peripheral (MFP), a laser beam printer (LBP), an LED printer, a multi-function laser beam printer including copy function. In accordance with an exemplary embodiment, the image forming apparatus 1 is a color printer. In accordance with another embodiment, the image forming apparatus 1 can be configured as a multi-function peripheral (MFP) device or all-in-one (AIO) that can include a printer section for converting print data inputted from outside to image data and forming and printing out the converted image onto a printable media, a scanner section for optically reading a document (for example, an image recognition system), and a facsimile section for facsimile receiving and transmitting image data to and from external apparatuses through public telecommunication lines.

Figure 2:
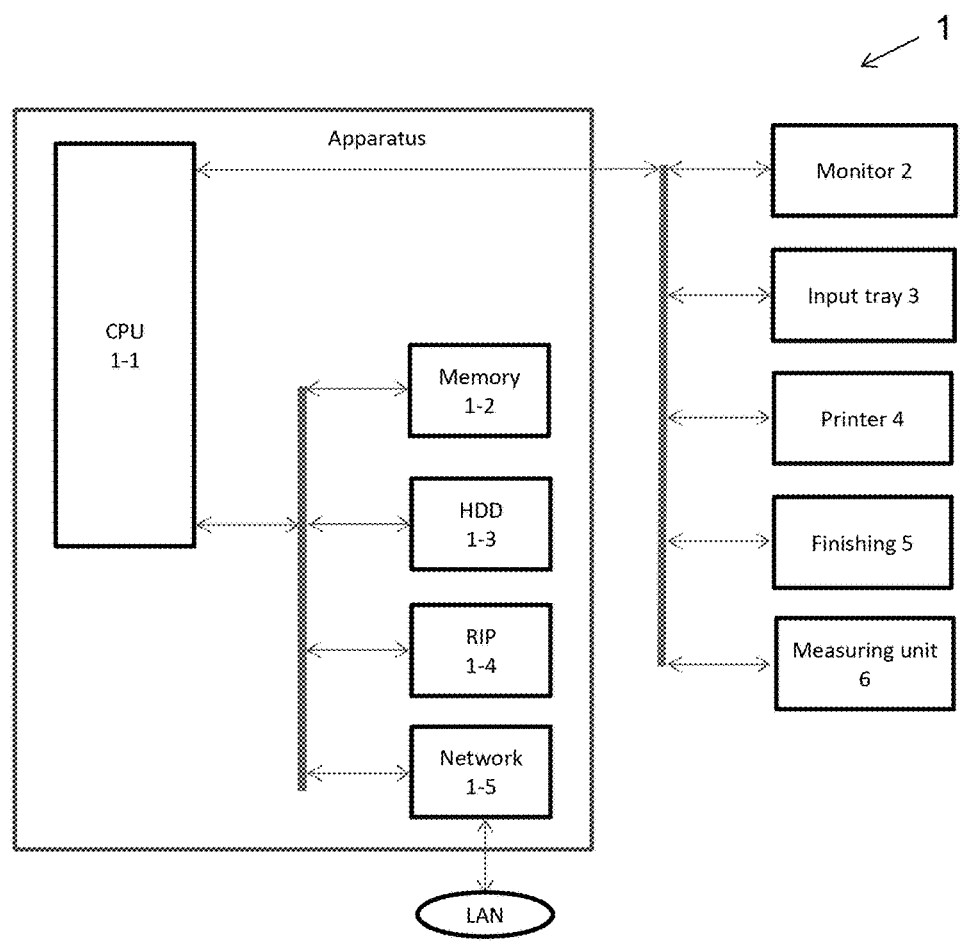
FIG. 2 is an illustration of a configuration of an image forming apparatus or printer in accordance with an exemplary embodiment.

FIG. 2 is a diagram of an exemplary image forming apparatus or printer 1 for use with the system 100 as shown in FIG. 1. As shown in FIG. 2, the printer 1 can include a processor or central processing unit (CPU) 1-1, one or more memories 1-2 and one or more HDD 1-3 (hard disk drives) for storing software programs and data (such as files to be printed), a raster image processor (RIP) 1-4, and a network interface (I/F) or module 1-5, which is connected to a communication network, for example, a local area network (LAN).

The printer 1 can also include a display unit (or input unit) or graphical user interface (GUI) 2, for example, a monitor, an input tray 3, a printer unit 4, which includes a printer engine, a finishing module (or post processing unit) 5, and a measuring unit 6, for example, a sensor or in-line sensor. A bus (not shown) can connect the various components 1-1, 1-2, 1-3, 1-4, 1-5, 2, 4, 5, and 6 within the printer 1. The printer 1 also includes an operating system (OS), which manages the computer hardware and provides common services for efficient execution of various software programs.

The image forming apparatus 1 can be a printer, however, it is within the scope of the disclosure for the image forming apparatus or printer 1 to be a copier. In accordance with an exemplary embodiment, the printer unit 4 has access to a print media (not shown) of various sizes and workflow for a print job, which can be, for example, stored in the input tray 3. A "print job" or "document" can be a set of related sheets, usually one or more collated copy sets copied from a set of original print job sheets or electronic document page images, from a particular user, or otherwise related. For submission of a regular print job (or customer job), digital data is generally sent to the printing system 100 from a client device (not shown) via a network connection 20. In accordance with an exemplary embodiment, the image forming apparatus 1 can also include an auto feeding mechanism in the input tray 3, wherein a user can feed one or more sheets or pages of a printed image, cover sheet of a package of print media and/or other documents to an image processing section for imaging and processing.

In accordance with an exemplary embodiment, the measuring unit 6, for example, can be one or more color sensors or colorimeters (not shown), such as an RGB scanner, a spectral scanner with a photo detector or other such sensing devices known in the art, which can be embedded in the printed paper path, and the finishing unit 5.

In accordance with an exemplary embodiment, it can be within the scope of the disclosure for the printer 1 to be a copier. The printer unit 4 has access to a print media (not shown) of various sizes and workflow for a print job, which can be, for example, stored in the input tray 3. A "print job" or "document" can be a set of related sheets, usually one or more collated copy sets copied from a set of original print job sheets or electronic document page images, from a particular user, or otherwise related.

For example, in accordance with an exemplary embodiment, an image processing section within the printer 1 can carry out various image processing under the control of a print controller or CPU 1-1, and sends the processed print image data to the print engine of the printer unit 4. The image processing section can also include a scanner section for optically reading a document, such as an image recognition system. The scanner section receives the image from the scanner and converts the image into a digital image. The printer engine 4 forms an image on a recording sheet based on the image data sent from the image processing section.

For example, in accordance with an exemplary embodiment, an image processing section within the multi-function peripheral 1 can carry out various image processing under the control of the printer unit 4, and sends the processed print image data to the print engine of the printer unit 4. The image processing section can also include a scanner section for optically reading a document, such as an image recognition system. The scanner section receives the image from the scanner and converts the image into a digital image. The print engine forms an image on a recording sheet based on the image data sent from the image processing section.

The central processing unit (CPU) (or processor) 1-1 and the memory 1-2 or HDD 1-3 can include a program for RIP processing (Raster Image Processing), which is a process for converting print data included in a print job into Raster Image data to be used in the printer unit 4. The CPU 1-1 can include a printer controller configured to process the data and job information received from the one or more client devices (not shown), for example, received via the network connection unit and/or input/output section (I/O section) 1-5.

The CPU 1-1 can also include an operating system (OS), which acts as an intermediary between the software programs and hardware components within the multi-function peripheral. The operating system (OS) manages the computer hardware and provides common services for efficient execution of various software applications. In accordance with an exemplary embodiment, the printer controller can process the data and job information received from the one or more client devices (not shown) to generate a print image.

The network I/F 1-5 performs data transfer with the at least one image forming apparatuses 2, 3, 4. The printer controller can be programmed to process data and control various other components of the multi-function peripheral to carry out the various methods described herein. In accordance with an exemplary embodiment, the operation of printer section commences when it receives a page description from the one or more client devices (not shown) via the network I/F 1-5 in the form of a print job data stream and/or fax data stream.

In accordance with an exemplary embodiment, the page description may be any kind of page description languages (PDLs), such as PostScript® (PS), Printer Control Language (PCL), Portable Document Format (PDF), and/or XML Paper Specification (XPS). Examples of image forming apparatuses or printers 1, 2, 3, N, consistent with exemplary embodiments of the disclosure include, but are not limited to, a multi-function peripheral (MFP), a laser beam printer (LBP), an LED printer, a multi-function laser beam printer including copy function.

In accordance with an exemplary embodiment, the monitor unit 2 can be a graphical user interface having a touch panel for user to operate the image forming apparatus 1, 2, 3, N. The input tray unit 3 is configured to hold a print media. The printer unit 4 includes components, which cause the image forming apparatus 1, 2, 3, N, to make printing images and output images on papers including photoreceptor, transfer belt, and a fusing unit. The finishing unit 5 can include finishing functions like punch, staple, and booklet, and the paper is output to the output tray on this unit. In accordance with an exemplary embodiment, the measuring unit 6 is an in-line sensor that can measure the color density of the chart and has the scanner function to read color and text on the chart as well. In addition, the measuring unit 6 can include an inserter tray in which the user (or operator) can put measurement charts which printed on other image forming apparatus on the inserter tray and which transfers papers having measure measurement charts to the in-line sensor.

FIG. 3 is an illustration of a chart 300 showing a list of measurement times for a plurality of image forming apparatuses in accordance with an exemplary embodiment, and which can be hosted on one of the image forming apparatuses 1, 2, 3, N, for example, image forming apparatus 1. As shown in FIG. 3, an administrator, for example, at a print shop, can make a schedule for each of the one or more image forming apparatuses 1, 2, 3, . . . N, which can include whether the image forming apparatus 1, 2, 3, N has a sensor, for example, an in-line sensor (Yes or No), a schedule for calibration, a non-schedule time for calibration, a tolerance level, for example, 0.20, and a group identifier.

FIG. 4 is an illustration of a diagram 400 showing a list of color results for a plurality of image forming apparatuses 1, 2, 3, N, in accordance with an exemplary embodiment. As shown in FIG. 4, the list of color results can be generated from the measurement results from each of the image forming apparatuses 1, 2, 3, N. The list can include a reference number or identifier for each of the devices or image forming apparatuses, for example, "Apparatus 1", "Apparatus 2", . . . , a device model, a group number, a read device identifier, and measurement reading at one or more different intervals or times.

Figure 5:
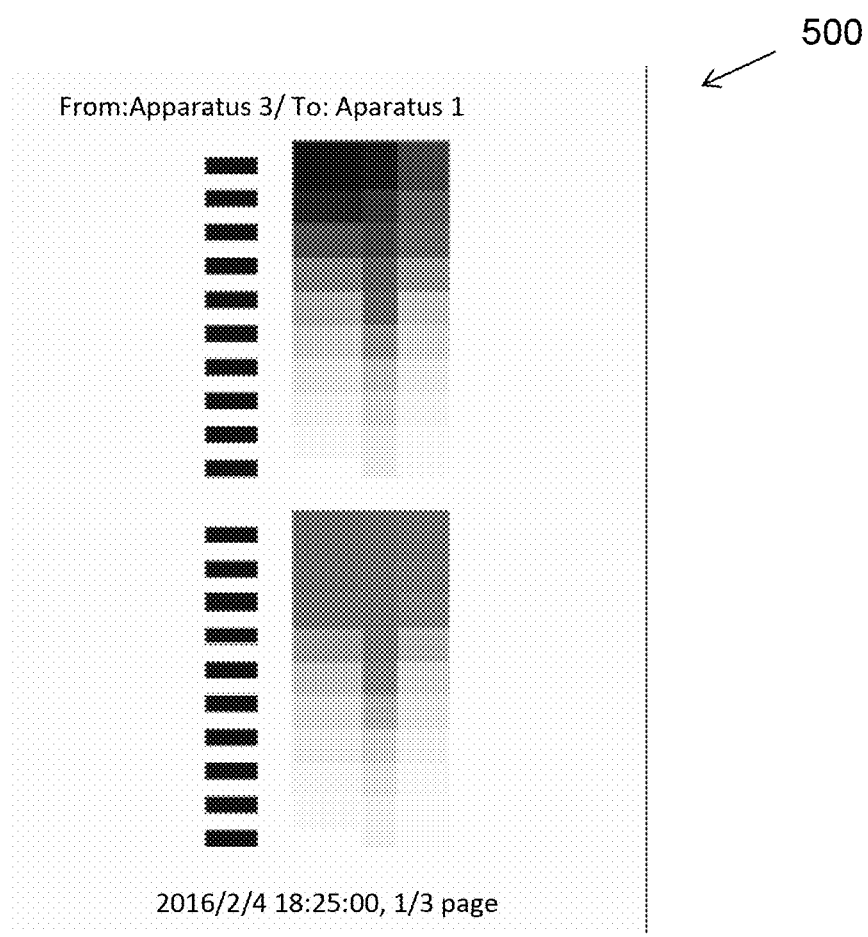
FIG. 5 is an illustration of a sample measurement chart in accordance with an exemplary embodiment.

FIG. 5 is an illustration of a sample measurement chart (or page) 500 in accordance with an exemplary embodiment. In accordance with an exemplary embodiment, as outlined in the charts as shown in FIGS. 3 and 4, for example, image forming apparatus 1 can request image forming apparatus 3 to print the measurement chart 500. As shown in FIG. 5, the measurement chart 500 has a plurality of color patches, which are printed and measured by a measuring unit 6, for example, a sensor or color sensing device in image forming apparatus 1, and then each of the colors measured by the measuring unit 6 is compared with a corresponding target color. If one of the measured colors does not match the corresponding target color, color corrections can then be made to the image forming apparatus, for example, image forming apparatus 3.

In accordance with an exemplary embodiment, for example, after printing, the printed measurement chart 500 is placed on the inserter tray of image forming apparatus 1 so that the printed measurement chart 500 can be read by the sensor within the measuring unit 6 of the image forming apparatus 1. For example, the user may manually walk over to image forming apparatus 1 and insert the printed measurement chart 500 on the inserter tray, or alternatively, if the arrangement of the printers 1, 2, 3, N, allows, the printed measurement chart 500 can be automatically fed to the inserter tray of image forming apparatus 1.

In accordance with an exemplary embodiment, identification information can be printed on the measurement chart 500 by the image forming apparatus 1, 2, 3, N, which can include, for example, identification of the image forming apparatus 1, 2, 3, N, which printed the measurement chart, and/or time information indicating a time in which the measurement chart was printed. In addition, if the user mistakenly places the measurement chart 500 on, for example, image forming apparatus 2, image forming apparatus 2 can show an error message to the user by reading the identification information of the chart.

Figure 6:
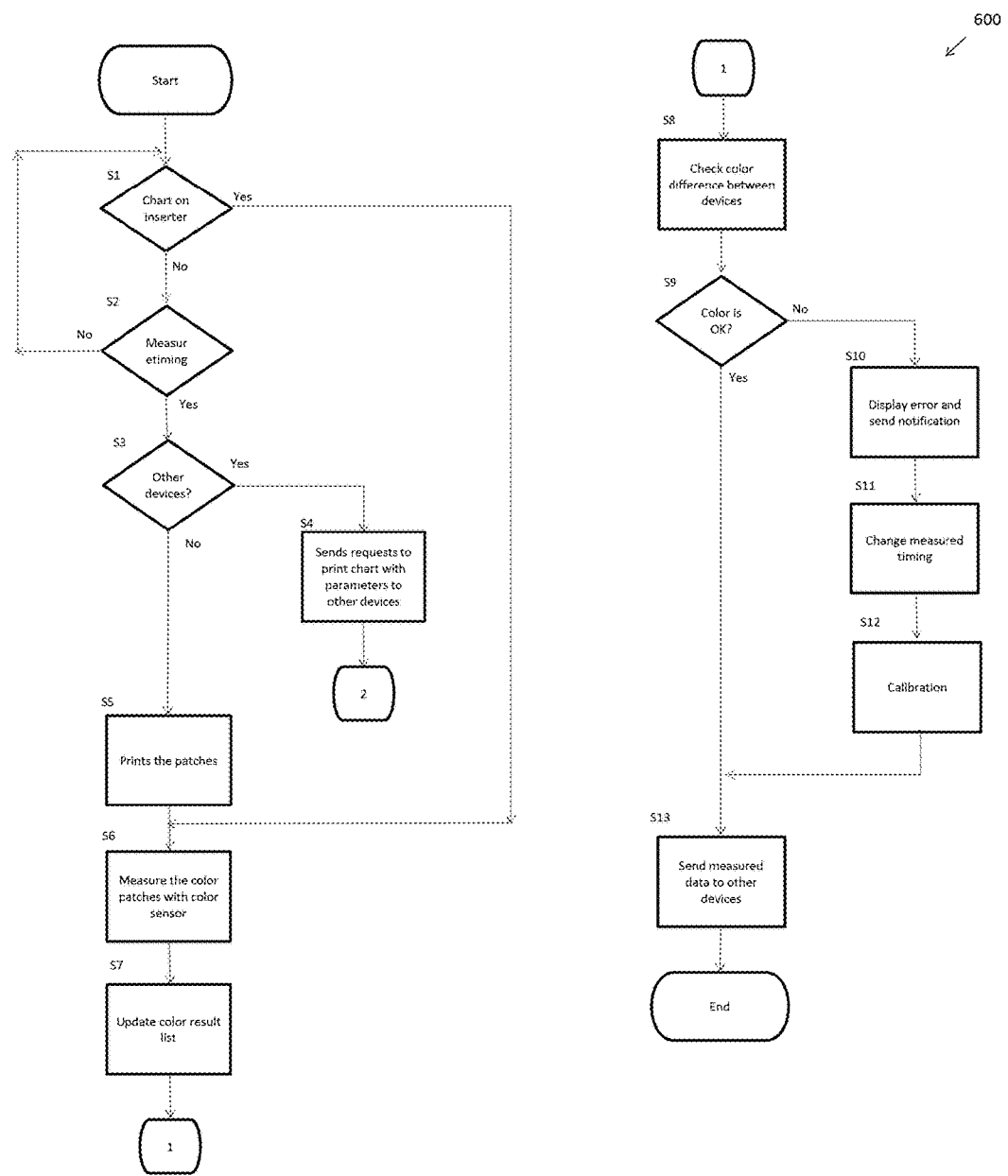
FIG. 6 is a flow chart in accordance with an exemplary embodiment.

FIG. 6 is a flow chart 600 in accordance with an exemplary embodiment in which the image forming apparatus 1 (or printer 1) has a sensor, for example, an in-line sensor. As shown in FIG. 6, in step S1, the image forming apparatus 1 checks whether measurement charts 500 are placed or present on the inserter tray of measuring unit 6, and if (YES) there is at least one measurement chart 500 on the inserter tray, the image forming apparatus 1 transfers the at least one measurement chart to an internal location within the image forming apparatus 1 wherein the sensors can read the at least one measurement chart 500 in step S6.

In accordance with an exemplary embodiment, if the inserter tray of the measuring unit 6 does not have at least one measurement chart in S1, (i.e., NO), the process continues to step S2, where the image forming apparatus 1 (or processing unit) determines if it is time to take a measurement. In accordance with an exemplary embodiment, the determination can be based on a scheduled timing, which is set by the user in advance, and/or a non-scheduled timing, which can be updated by image forming apparatus 1. If the system 100 is very busy, for example, the image forming apparatuses 1, 2, 3, are printing non-stop, color degradation may occur faster than the scheduled timing. In accordance with an exemplary embodiment, image forming apparatus (or processing unit) 1 may want to make an additional non-scheduled measurement. In accordance with an exemplary embodiment, the timing when a measurement is performed can be based on, for example, the number of pages printed (non-scheduled), scheduled times based an amount of elapsed time since the last measurement, on a predetermined schedule or time, and/or based on timing of printed measurement chart and/or results of printed measurement charts printed by one or more image forming apparatuses (or printers) 1, 2, 3, N, and measured by a sensor on one of the plurality of image forming apparatus 1, 2, 3, N.

Figure 7:
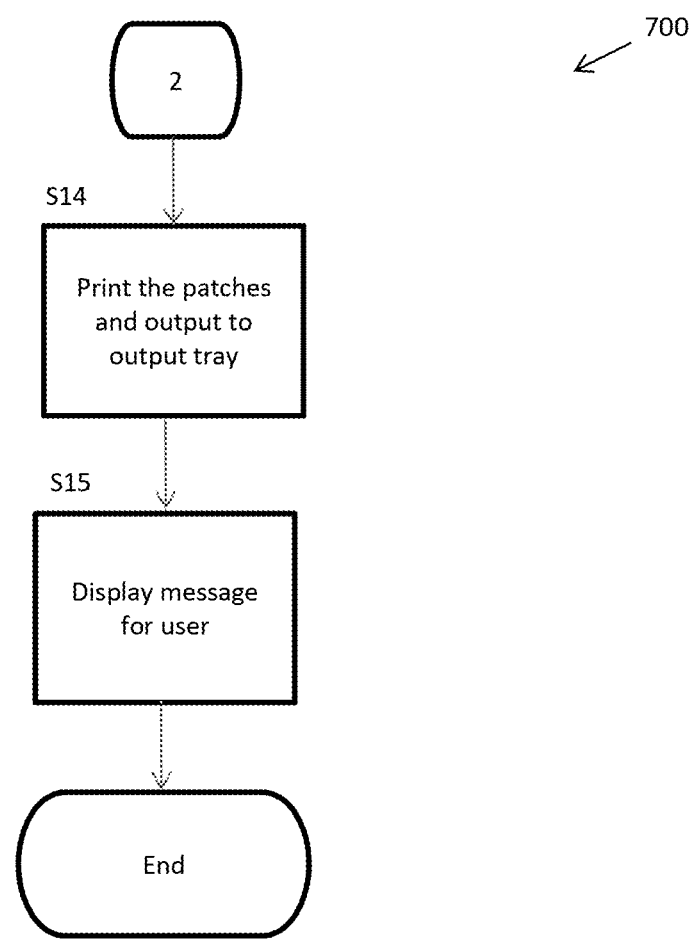
FIG. 7 is a flow chart in accordance with an exemplary embodiment.

In accordance with an exemplary embodiment, if in step S2 it is determined that it is time to take a measurement, i.e., YES, the process continues to step S3. If it is not time to take a measurement, i.e., NO, the process returns to step S1. In step S3, the processing unit 1 determines, from which image forming apparatus 2, 3, N, the measurement chart was received. If the measurement charts 500 for each of the image forming apparatuses 2, 3, N listed in the diagram 400 (FIG. 4) chart are not provided (i.e., Yes) and placed on the input tray of the measuring unit 6 of image forming apparatus 1, the process continues to step S4, wherein the image forming apparatus 1 sends a request to each of the image forming apparatuses 2, 3, N, which has not provide as color measurement chart 500 in accordance with the schedule hosted by the processing unit 1. In accordance with an exemplary embodiment, the request to print the measurement chart (FIG. 5) can be sent via the network I/F 1-5. In accordance with an exemplary embodiment, the printing of the measurement charts 500 on each of the other image forming apparatuses 2, 3, N, which have not provided a measurement chart, is shown in FIG. 7.

If the measurement charts 500 have been provided, i.e., NO, the process continues to step S5. In step S5, the image forming apparatus 1 produces or generates a measurement chart bitmap, the printer unit 4 prints the data to a print media, for example, paper, and the printed media and/or papers are transferred to the measuring unit 6. In step S6, the measuring unit 6 reads the color patches on printed media with the sensor in the measuring unit 6 and scans the information (e.g. identification information, time information and so on) with scanner, and then each of the colors measured by the measuring device or sensor can be compared with a corresponding target color. If one of the measured colors does not match the corresponding target color, color corrections can then be made to the image forming apparatus 2, 3, N, for example, image forming apparatus 3.

In step S7, the image forming apparatus 1 updates the list of color results as shown in FIG. 4. In step S8, the image forming apparatus 1 checks the difference of colors from color result list. For example, as shown, for example, in FIG. 4, image forming apparatus 1 found the difference in yellow color between 12:00 and 18:00 on Apparatus 1. More specifically, at 12:00, Y=0.75. However, there was a degradation in color quality at 18:00 where Y=0.51. At 18:25, this difference will be found not only on Apparatus 1 but also Y is different in Apparatus 2 and Apparatus 3.

In accordance with an exemplary embodiment, in step S9, if there is no color difference, the process ends, i.e., go to End. If there is a color difference, the process goes to step S10, where "color difference" can be determined by a tolerance level, for example, see FIG. 3. If the difference is higher than the tolerance, then there is "color difference". For example, the tolerance in Apparatus 1 is 0.20 as shown in FIG. 3. In addition, as shown in FIG. 4, there is a difference in Y from 12:00 to 18:00 where the difference is 0.24 (0.75–0.51).

In step S10, when the image forming apparatus 1 determines a color difference, the error message is shown on the monitor 2 and/or the image forming apparatus 1 sends a message to the administrator of the print system 100, for example, by email, text and/or print out. In step S11, the image forming apparatus 1 updates the non-scheduled measurement portion in the measurement timing list 300, if needed. For example, in this case, 6:25 PM is added for next measurement timing for Group 1. In step S12, the image forming apparatus 1 can show a message to execute calibration or color correction on image forming apparatuses 1, 2, 3, N, having a color difference, and the user can execute calibration or color correction, if needed. In step S13, the measured data or color correction data is sent to other image forming apparatuses 2, 3, N.

FIG. 7 is a flow chart in accordance with an exemplary embodiment in which the image forming apparatus 3, N, does not have a sensor, for example, an in-line sensor. As shown in FIG. 7, in step S14, the image forming apparatus 3, N, prints the patches and outputs it to an output tray when it receives the request to print measurement chart. In step S15, the image forming apparatus 3, N can display a message for a user or administrator to bring the measurement charts 500 to a specified image forming apparatus (or processing unit) 1 and place the measurement charts 500 on the insert tray of the specified image forming apparatus 1 as shown in FIG. 6.

In accordance with an exemplary embodiment, a method is disclosed for a first printer connected to a second printer to perform color calibration for the second printer, wherein the second printer does not have a sensor, the first printer including a sensor which measures a media, which has been printed by the second printer and is being fed on a media path of the first printer. The method can include (a) determining the timing to instruct the second printer to print a first measurement chart, (b) instructing, at the timing determined at step (a), the second printer to print the first measurement chart, (c) measuring, by the sensor, the first measurement chart which has been printed by the second printer, and (d) outputting information corresponding to a result measured at step (c).

In accordance with an exemplary embodiment, for example, at step (a), the instruction timing is determined based on measurement charts printed by the first printer and a third printer, or at step (a), the instruction timing is determined based on a user operation to an input unit on the first printer. In accordance with an exemplary embodiment, the first printer can include, for example, a display unit or an input unit 2, and wherein, at step (a), the instruction timing is determined based on a user operation to the input unit.

In accordance with an exemplary embodiment, a non-transitory computer readable recording medium stored with a computer readable program code is disclosed for a first printer connected to a second printer to perform color calibration for the second printer, and wherein the second printer does not have a sensor, the computer readable program code configured to execute a process comprising: (a) determining the timing to instruct the second printer to print a first measurement chart; (b) instructing, at the timing determined at step (a), the second printer to print the first measurement chart; (c) measuring, by a sensor on the first printer, the first measurement chart which has been printed by the second printer; and (d) outputting information corresponding to a result measured at step (c).

The computer readable recording medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for a first printer connected to a second printer to perform color calibration for the second printer, the method comprising:
 (a) determining a timing to instruct the second printer to print a first measurement chart, wherein the second printer does not have a sensor, the first printer including a sensor which measures a media, which has been printed by the second printer and is being fed on a media path of the first printer, and wherein the timing to instruct the second printer to print the first measurement chart is on a predetermined time schedule for the second printer, an amount of time elapsed since a last measurement for the second printer, or after the second printer has printed a predetermined number of sheets of a print media;
 (b) instructing, at the timing determined at step (a), the second printer to print the first measurement chart;
 (c) measuring, by the sensor, the first measurement chart which has been printed by the second printer;
 (d) outputting information corresponding to a result measured at step (c) only when the result measured at step (c) exceeds a predetermined tolerance level, and wherein the predetermined tolerance level reflects a color difference between a corresponding target color and at least one measured color;
 (e) updating a list of color results for the first printer and the second printer;
 (f) checking color differences between the first printer and the second printer based on the list of color results for the first printer and the second printer; and
 (g) executing a color calibration on the first printer and the second printer upon a determination that the color differences between the first printer and the second printer exceed a tolerance level.

2. The method of claim 1, wherein the first printer further comprises:
 an input unit, and
 wherein, at step (a), the instruction timing is further determined based on a user operation to the input unit.

3. The method of claim 1, comprising:
 printing identification information on the first measurement chart by the second printer.

4. The method of claim 1, comprising:
 printing time information on the first measurement chart by the second printer, the time information indicating timing at which the first measurement chart is printed by the second printer.

5. The method of claim 1, wherein the first printer and second printer belong to a group comprising:
 printers of which can be used in order to execute a single split job, or
 printers of which are a same model.

6. The method of claim 1, comprising:
 instructing the second printer to conduct color calibration based on the information corresponding to the result measured at step (c) when the result measured at step (c) exceeds the predetermined tolerance level.

7. The method of claim 1, wherein the first measurement chart is a color validation chart having one or more color patches.

8. The method of claim 1, comprising:
updating the amount of time elapsed since the last measurement for the second printer when the result measured at step (c) exceeds a predetermined tolerance level.

9. The method of claim 1, wherein the outputting information corresponding to the result measured at step (c) comprises:
sending a message to an administrator by e-mail, text, and/or a print out; or
displaying the message on a display of the first printer.

10. A first printer connected to a second printer and configured to perform color calibration for the second printer, wherein the second printer does not have a sensor, the first printer comprising:
a sensor which measures a media, which has been printed by the second printer and is being fed on a media path of the first printer; and
a processor configured to:
(a) determine the timing to instruct the second printer to print a first measurement chart, and wherein the timing to instruct the second printer to print the first measurement chart is on a predetermined time schedule for the second printer, an amount of time elapsed since a last measurement for the second printer, or after the second printer has printed a predetermined number of sheets of a print media;
(b) instruct, at the timing determined at step (a), the second printer to print the first measurement chart;
(c) measure, by the sensor, the first measurement chart which has been printed by the second printer;
(d) output information corresponding to a result measured at step (c) only when the result measured at step (c) exceeds a predetermined tolerance level, and wherein the predetermined tolerance level reflects a color difference between a corresponding target color and at least one measured color;
(e) update a list of color results for the first printer and the second printer;
(f) check color differences between the first printer and the second printer based on the list of color results for the first printer and the second printer; and
(g) execute a color calibration on the first printer and the second printer upon a determination that the color differences between the first printer and the second printer exceed a tolerance level.

11. The first printer of claim 10, wherein the first printer further comprises:
an input unit, and
wherein, at step (a), the instruction timing is further determined based on a user operation to the input unit.

12. The first printer of claim 10, wherein the first measurement chart printed by the second printer includes identification information.

13. The first printer of claim 10, wherein the processor of the first printer in configured to:
instruct the second printer to conduct color calibration based on the information corresponding to the result measured at step (c) when the result measured at step (c) exceeds the predetermined tolerance level.

14. The first printer of claim 10, comprising:
updating the amount of time elapsed since the last measurement for the second printer when the result measured at step (c) exceeds a predetermined tolerance level.

15. The first printer of claim 10, wherein the outputting information corresponding to the result measured at step (c) comprises:
sending a message to an administrator by e-mail, text, and/or a print out; or
displaying the message on a display of the first printer.

16. A non-transitory computer readable recording medium stored with a computer readable program code for a first printer connected to a second printer to perform color calibration for the second printer, the computer readable program code configured to execute a process comprising:
(a) determining the timing to instruct the second printer to print a first measurement chart, wherein the second printer does not have a sensor, the first printer including a sensor which measures a media, which has been printed by the second printer and is being fed on a media path of the first printer, and wherein the timing to instruct the second printer to print the first measurement chart is on a predetermined time schedule for the second printer, an amount of time elapsed since a last measurement for the second printer, or after the second printer has printed a predetermined number of sheets of a print media;
(b) instructing, at the timing determined at step (a), the second printer to print the first measurement chart;
(c) measuring, by a sensor on the first printer, the first measurement chart which has been printed by the second printer;
(d) outputting information corresponding to a result measured at step (c) only when the result measured at step (c) exceeds a predetermined tolerance level, and wherein the predetermined tolerance level reflects a color difference between a corresponding target color and at least one measured color;
(e) updating a list of color results for the first printer and the second printer;
(f) checking color differences between the first printer and the second printer based on the list of color results for the first printer and the second printer; and
(g) executing a color calibration on the first printer and the second printer upon a determination that the color differences between the first printer and the second printer exceed a tolerance level.

17. The non-transitory computer readable recording medium of claim 16, comprising:
wherein, at step (a), the instruction timing is further determined based on a user operation to an input unit on the first printer.

18. The non-transitory computer readable recording medium of claim 16, comprising:
printing identification information on the first measurement chart by the second printer, the time information indicating timing at which the first measurement chart is printed by the second printer.

19. The non-transitory computer readable recording medium of claim 16, comprising:
updating the amount of time elapsed since the last measurement for the second printer when the result measured at step (c) exceeds a predetermined tolerance level; and
instruct the second printer to conduct color calibration based on the information corresponding to the result measured at step (c) when the result measured at step (c) exceeds the predetermined tolerance level.

20. The non-transitory computer readable recording medium of claim 16, wherein the outputting information corresponding to the result measured at step (c) comprises:
   sending a message to an administrator by e-mail, text, and/or a print out; or
   displaying the message on a display of the first printer.

\* \* \* \* \*